United States Patent Office 3,826,648
Patented July 30, 1974

3,826,648
METHOD OF PURIFYING ZINC SULPHATE SOLUTIONS
Fernand Jacques Joseph Bodson, Angleur, Belgium, assignor to Societe des Mines et Fonderils de Zinc de la Vielle Montagne, Angleur, Belgium
No Drawing. Filed Sept. 7, 1972, Ser. No. 287,193
Claims priority, application Belgium, May 16, 1972, 43,706
Int. Cl. C22b 15/12, 17/04, 23/04
U.S. Cl. 75—109
11 Claims

ABSTRACT OF THE DISCLOSURE

A zinc sulphate solution resulting from the leaching of zinc ores is treated by a method of purifying comprising adding to said solution which has been previously purified by means of coprecipitation of hydrolysable impurities with iron hydroxide, metallic zinc in an amount such that the copper and cadmium present are eliminated by cementation; separating the copper cement and cadmium cement from the solution; heating the solution to a temperature between 80° C. and its boiling point; adding to the solution antimony and zinc powder in amounts such that the cobalt and the other impurities are eliminated by cementation from the zinc sulphate solution, and separating the cobalt cement and the other impurities from the solution.

This invention relates to a method of purifying zinc sulphate solutions resulting from the leaching of zinc ores and intended for use in the production of zinc by electrolysis.

It is known that the presence in very low concentrations of certain impurities in electrolytic solutions of zinc sulphate can lead to great difficulties during the electrolytic process, since the impurities have an unfavourable effect on the Faradic yield. These electrolytic solutions moreover contain other impurities in such concentrations that the zinc which is produced would be polluted if impurities had not been previously eliminated.

Two types of methods are usually employed consecutively to purify zinc sulphate solutions resulting from the leaching of zinc ores.

The first type of method comprises purifying the zinc sulphate solution by oxidation and hydrolysis: during the leaching proper oxidation and coprecipitation of all the impurities whose hydrolysis pH value is lower than that of zinc (5.4 under normal working conditions) is carried out with iron in the ferric state (III) acting as an entraining agent. This makes it possible to eliminate most of the iron, arsenic, antimony, germanium, tin and certain other elements. However, the leached zinc sulphate solution still contains some of these impurities, notably antimony, in considerable quantities, as well as other impurities which it is not possible to eliminate by oxidation and hydrolysis, for example copper, cadmium, cobalt, nickel, thallium.

The second type of method seeks to eliminate these remaining impurities. This second method comprises zinc powder cementation of the elements which are to be eliminated from the solution. The metallic elements still present as impurities are considerably more electropositive than zinc, and therefore their cementation does not cause any undue difficulties. However, cementation of nickel and, particularly, cobalt does prove difficult and requires certain artifices. Thus cobalt cannot be commercially and technically cemented with zinc powder except at a relatively high temperature (70 to 100° C.) in the presence of an excess of zinc and other elements capable of catalyzing the reaction.

It has been established that the presence of copper accompanied by antimony, arsenic or tin is necessary to obtain elimination of the cobalt; usually the pair of elements which is most used are copper and antimony or copper and arsenic. However, the necessity for the presence of copper in the elimination of the cobalt presents major problems, in particular during the subsequent treating of the purification cement. Industrial solutions resulting from the leaching of ores which have to be subjected to purification generally contain such elements as copper and cadmium. If it is desired to hold the copper and cadmium. If it is desired to hold the copper in solution as a catalyst for the purification of cobalt, then all the elements which are more electro-negative than copper, in particular cadmium, will likewise remain in solution.

It has been proposed to eliminate the copper and the cadmium completely by zinc powder cementation followed by the deliberate addition of the copper needed for cobalt cementation in a soluble form such as sulphate. This method is however, expensive and complicated and is seldom used. Thus significant quantities of copper are required to eliminate the cobalt; for example copper should be present in an amount of 200 mg./l. when copper and antimony are used and in an amount more than 500 mg./l. when copper and arsenic are used.

Therefore the purification cement must contain copper, cadmium and cobalt as well as zinc which is added in excess. The subsequent treatment of the cement is not easy although it is economically desirable to recover from the cement separately the zinc, cadmium, and copper. Dissolving in dilute acid takes place according to the reaction:

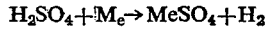

$$H_2SO_4 + M_c \rightarrow MeSO_4 + H_2$$

The copper, being electropositive, cannot be dissolved by such a reaction in the absence of an oxidizing agent. Of the three other elements, most of the excess zinc can be dissolved without too much difficulty. However, separation of the cadmium and of the cobalt is more difficult, since these two elements have standard electrochemical potentials which are very close to each other so that their solution in acid is not particularly selective. Therefore it must be accepted that the final copper cement still contains cadmium whereas the cadmiferous solution contains a not insignificant quantity of cobalt. Often the cadmiferous solution, after the recovery of the cadmium, must be further subjected to a process for the removal of cobalt if the amount of the latter in the residual solution is to be kept below an acceptable value.

Flow sheet No. 1 below constitutes a summary of the normal purifications method of zinc sulphate solutions using cementation.

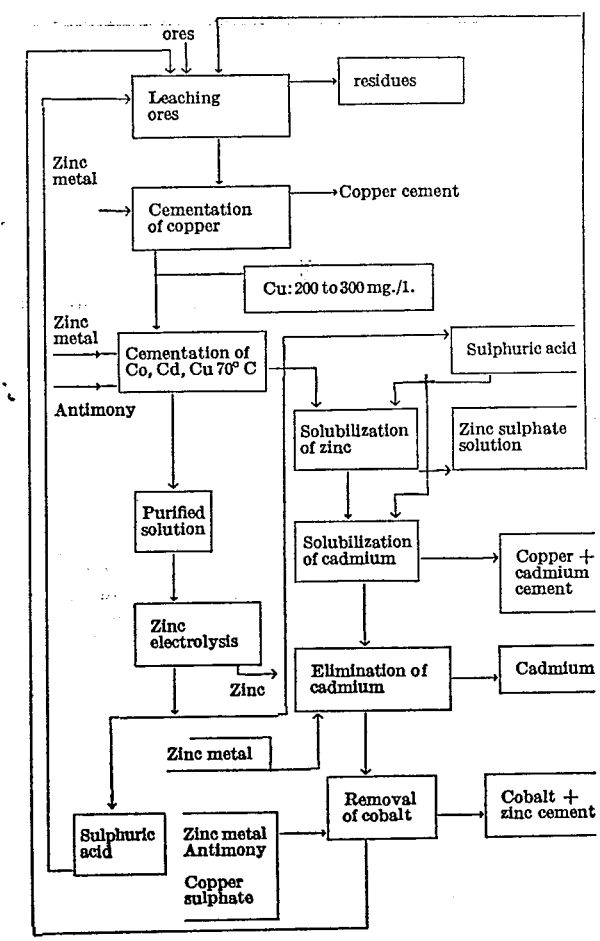

Flow Sheet No. 1

Flow-sheet No. 1 assumes that the ores which are treated contain copper in an amount sufficient to give solutions having a concentration of copper greater than 200 mg./l., thus necessitating pre-cementation in order to adjust the amount of copper to this value during purification proper.

The present invention provides a method of purifying a zinc sulphate solution wherein, under certain operating conditions, the presence of copper is not required for the elimination of cobalt by zinc powder cementation.

The invention consists in a method of purifying zinc sulphate solution resulting from the leaching of zinc ores, comprising: adding to a solution which has been previously purified by means of coprecipitation of hydrolyzable impurities with iron hydroxide, metallic zinc in an amount such that the copper and cadmium present are totally eliminated by cementation; separating the copper cement and cadmium cement from the solution; heating the solution to a temperature between 80° C. and its boiling point; adding to the solution antimony and zinc powder in amounts such that the cobalt and the other impurities are eliminated by cementation from the zinc sulphate solution; and separating the cobalt cement and the other impurities from the solution.

Advantageously the zinc powder may be added to the solution as a suspension in a little water.

In these conditions the cobalt and the other impurities still present are completely eliminated, usually in under two hours. After separation of the cobaltiferous cement, the zinc sulphate solution may be electrolysed, as soon as it has cooled, in order to recover the zinc.

The amount of antimony and zinc powder added will depend in particular on the amount of cobalt to be eliminated and the quality of the zinc powder which is used. Preferably, the ratio of the amount of antimony added to the amount of zinc powder added is between 0.1 mg./g. and 1 mg./g.

The amount of zinc powder added to the purified solution, after elimination of the copper, and the cadmium is between 1 and 6 g./l.

The antimony is preferably added in the form of $Sb_2O_3$ oxide.

The cementation of cobalt may be achieved by using as zinc powder either powder obtained by the condensation of zinc vapour or powders obtained by the dispersion of a jet of liquid zinc into various fluids, for example air.

It is desirable that these zinc powders contain a certain amount of lead, preferably between 0.5 and 2% by weight, more preferably of the order of 1% by weight.

The lead in the form of soluble or insoluble salt improves the elimination of antimony and thallium in particular.

If the zinc powder does not contain lead or if the amount of lead present in the zinc powder is insufficient, then lead in the form of its salts, for example lead sulphates may be added to the solution at the same time as the antimony is added but before the addition of the zinc powder. The amount of lead sulphate added is suitably 100 mg./l.

Flow-sheet No. 2 below constitutes a summary of the present method of purifying zinc sulphate solution.

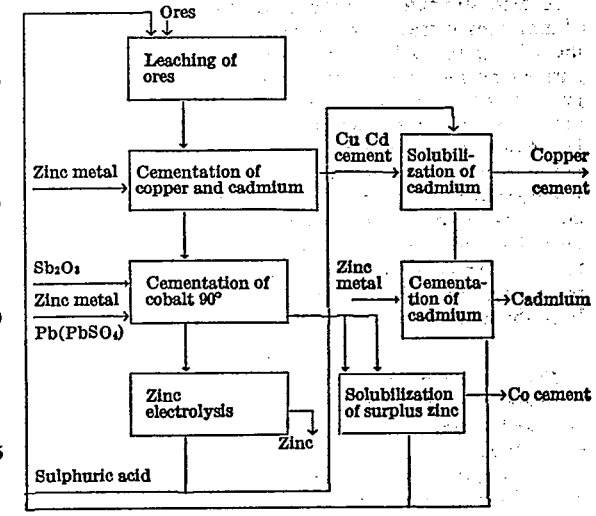

Flow-sheet No. 2

The invention will be further described with reference to the following examples.

EXAMPLE 1

A total of 2 g./l. zinc powder were added in four times at ten minute intervals to a solution resulting from leaching of zinc ores, the solution being held at a temperature of 50° C. The solution was stirred for 30 minutes after the last batch of the zinc had been added, and the cement obtained was separated from the solution by filtration.

The amounts of the various elements in the solution before and after the above operation were as follows.

| Element: | Amount before, mg./l. | Amount afterwards, mg./l. |
|---|---|---|
| Cu | 690 | <1 |
| Cd | 774 | <0.2 |
| Sb | 0.35 | 0.1 |
| Co | 60 | 57.5 |
| Tl | 12 | 0.95 |

The cement obtained had the following analysis:

Percent
Zn _____ 35
Cu _____ 6
Cd _____ 7

The filtered solution was then raised to a temperature of 90° C. Antimony was added to the solution in the form of $Sb_2O_3$ in an amount of 1.2 mg./l. together with 4 g./l. zinc powder containing 0.9% lead and resulting from the condensation of zinc vapours. The solution was stirred for two hours to eliminate most of the cobalt, the concentration of which remaining in the solution was less than 0.05 g./l. The stirring was ceased and a cement containing the cobalt separated by filtration.

The zinc sulphate solution purified in this manner was suitable for use in producing zinc by means of electrolysis.

The two cements obtained were re-treated as follows:

(a) The cement from the first purification containing 35% Zn, 6% Cu and 7% Cd was reacted with sulphuric acid to dissolve the cadmium at a temperature of 60° C. and at a final acidity of 7.5 g./l. lasting 48 hours.

After this treatment the solution containing the cadmium was separated from the cement containing the copper.

Analysis of the cadmium-containing solution gave the following:

Cu _____ mg./l__ 0.22
Cd _____ g./l__ 28.3

Analysis of the reacted cement gave the following:

|  | Percent |
|---|---|
| Cu | 42.6 |
| Zn | 7.78 |
| Cd | 0.65 |

As is apparent from the two analyses more than 99% of the cadmium was recovered.

(b) The cement from the second purification containing zinc and cobalt was treated as follows:

The cement obtained from 34 litres of solution to which 4 g./l. zinc powder had been added to extract the cobalt was treated with sulphuric acid for 6 hours 30 minutes at a temperature of 60° C. and at a pH between 2 and 3.5. After this treatment there was obtained 4.5 g. cement reacting with cobalt, containing 38.5% cobalt and 17% Zn, and 2.90 litres of solution containing 9 mg./l. cobalt.

It was therefore apparent that less than 2% cobalt had been redissolved and that more than 99% of the zinc, added in the form of powder, had been redissolved.

EXAMPLE 2

Comparison of zinc powders for cobalt cementation

Tests were carried out on a commercially available zinc sulphate solution from which the copper and cadmium had been eliminated, as in Example 1.

Four different powders were used, these being:

Powder A: a powder resulting from the condensation of zinc vapours and containing no lead;

Powder B: a powder resulting from the condensation of zinc vapours and containing 0.91% lead;

Powder C: a powder resulting from dispering a liquid jet of zinc and not containing any lead;

Powder D: a powder resulting from dispersing a liquid jet of zinc and containing 0.97% lead.

TEST RESULTS

| Powder | A | B | C | D |
|---|---|---|---|---|
| Temperature, ° C | 90 | 90 | 90 | 90 |
| Quantity of $Sb_2O_3$ added, mg./l. | 1.2 | 1.2 | 1.2 | 1.2 |
| Quantity of Zn added, g./l. | 4 | 4 | 4 | 4 |
| Levels of cobalt, mg./l.: |  |  |  |  |
| Initially | 48 | 48 | 50 | 48 |
| After— |  |  |  |  |
| ½ hr | 3.56 | 4 | 34.4 | 22.4 |
| 1 hr | 0.24 | 0.7 | 23.6 | 10.6 |
| 2 hrs | 3.6 | 0.05 | 14 | 1.3 |
| 3 hrs | >3.6 | 0.05 | 8.4 | 0.3 |
| 4 hrs | >3.6 | 0.05 | 6 | 0.06 |
| 5 hrs | >3.6 | 0.05 | 5.4 | <0.05 |

EXAMPLE 3

Behaviour of zinc powder not containing lead (left-hand column) and after the addition of lead (right-hand column)

Tests were carried out on the commercially available solution from which the copper and cadmium had been eliminated, using the powder C from Example No. 2.

|  | Powder C |  |
|---|---|---|
| Temperature, ° C | 90 | 90 |
| Quantity of $Sb_2O_3$ added in mg./l. | 3.6 | 3.6 |
| Quantity of Zn added in g./l. | 5 | 5 |
| Quantity of Pb (mg./l) added in the form of acetate | 0 | 50 |
| Levels of cobalt (mg./l.): |  |  |
| Initially | 48.5 | 52 |
| After— |  |  |
| ½ h | 29.4 | 16.2 |
| 1 h | 16 | 4.35 |
| 2 h | 5.2 | 0.32 |
| 3 h | 1.25 | <0.05 |
| 4 h | 0.56 | <0.05 |
| 5 h | 0.21 | <0.05 |

The tests clearly show that the presence of lead facilitates more rapid and more complete elimination of the cobalt.

EXAMPLE 4

Effect of the amount of cobalt present in solution on the amount of antimony and zinc to be added Tests were carried out using powder B on the commercially available zinc sulphate solution from which the copper and cadmium had been eliminated.

|  | Powder B |  |  |  |
|---|---|---|---|---|
| Temperature, ° C | 90 | 90 | 90 | 90 |
| Quantity of $Sb_2O_3$ added, mg./l. | 0.6 | 0.6 | 0.9 | 1.2 |
| Quantity of Zn added, g./l. | 3 | 3 | 3 | 4 |
| Levels of cobalt, mg./l.: |  |  |  |  |
| Initially | 8.6 | 47.5 | 52 | 48 |
| After— |  |  |  |  |
| ½ hr | 2.1 | 28 | 17.2 | 4 |
| 1 hr | 0.21 | 21 | 7.6 | 0.7 |
| 2 hr | <0.05 | 28 | 4.1 | <0.05 |
| 3 hr | <0.05 | 35 | 14.5 | <0.05 |
| 4 hr | <0.05 | 35 | 21.75 | <0.05 |
| 5 hr | <0.05 | 35 | 24 | <0.05 |

The above table clearly shows on the one hand the favourable effect of increasing the quantity of zinc (compare third and fourth column), and on the other hand the even more favourable effect of increasing the $Sb_2O_3$ concentration.

EXAMPLE 5

Effect of the addition of a lead salt on the elimination of other impurities during the cementation of the cobalt These tests were carried out using powder D containing 0.97% lead.

| Type of powder | Powder D | | | Powder D | | |
|---|---|---|---|---|---|---|
| Temperature, ° C | 90 | | | 90 | | |
| Quantity of $Sb_2O_3$ added, mg./l. | 2.4 | | | 2.4 | | |
| Quantity of Zn added, g./l. | 5 | | | 5 | | |
| Quantity of lead sulphate added, mg./l. |  | | | 100 | | |
|  | Co, mg./l. | Tl, mg./l. | Sb, mg./l. | Co, mg./l. | Tl, mg./l. | Sb, mg./l. |
| Levels: |  |  |  |  |  |  |
| Initially | 56 | 9.7 | 2 | 56 | 9.7 | 2 |
| After— |  |  |  |  |  |  |
| ½ hr | 7 | | | 19.8 | | |
| 1 hr | 1 | −0.825 | 0.038 | 2.85 | −0.235 | 0.015 |
| 2 hr | <0.05 | 0.795 | 0.040 | 0.05 | 0.130 | 0.012 |
| 3 hr | <0.05 | 0.580 | 0.042 | <0.05 | 0.170 | 0.011 |
| 4 hr | <0.05 | 0.620 | 0.028 | <0.05 | 0.150 | 0.009 |
| 5 hr | <0.05 | 0.620 | 0.017 | <0.05 | 0.140 | 0.009 |

It is apparent that the addition of a lead salt to a solution of powder D has a favourable effect on the elimination of impurities other than cobalt, in particular thallium and antimony during the cementation of the cobalt. This is surprising considering that powder D already contains 0.97% lead.

What we claim is:

1. In a method of purifying a zinc sulphate solution resulting from the leaching of zinc ores, said solution having been previously purified by addition of iron hydroxide for precipitating hydrolyzable impurities, the improvement comprising the steps of: adding metallic zinc powder to said previously purified solution for producing a copper and cadmium cement and thereby substantially reducing the copper and cadmium concentration in said solution to less than 1 mg./l. and 0.2 mg./l. respectively, separating said copper and cadmium cements from said solution, heating said separate solution to a temperature between 80° C. and the boiling point, adding antimony and zinc powder to said solution for forming a cementation of cobalt and other impurities, and removing said cementation of cobalt and other impurities from said solution.

2. A method as claimed in claim 1 wherein a lead salt is added at the same time as the antimony and before the zinc powder to the purified solution, after elimination of the copper and the cadmium.

3. A method as claimed in claim 2, the lead salt added is lead sulphate.

4. A method as claimed in claim 3, wherein the lead sulphate is added in an amount of 100 mg./l.

5. A method as claimed in claim 1, wherein the zinc powder contains lead in amount between 0.5 and 2% by weight.

6. A method as claimed in claim 5, wherein the zinc powder contains lead in an amount of the order of 1% by weight.

7. A method as claimed in claim 1, wherein said metallic zinc is added to said zinc sulphate solution as a powder in suspension in a small quantity of water.

8. A method as claimed in claim 1, wherein said antimony is added as $Sb_2O_3$.

9. A method as claimed in claim 1 wherein the ratio of the amount of antimony added to the amount of zinc powder added is between 0.1 and 1 mg./g.

10. A method as claimed in claim 1, wherein the amount of zinc powder added to the purified solution, after elimination of the copper and the cadmium, is between 1 and 6 g./l.

11. A method as claimed in claim 1, wherein the zinc powder employed in the cementation of cobalt is obtained by the condensation of zinc vapor or by the dispersion of a jet of liquid zinc.

References Cited

UNITED STATES PATENTS

| | | | |
|---|---|---|---|
| 3,672,868 | 6/1972 | Hasegawa et al. | 75—109 |
| 3,579,327 | 5/1971 | Hasegawa et al. | 75—109 |
| 2,405,302 | 8/1946 | Griffith et al. | 75—109 |
| 2,396,569 | 3/1946 | Griffith et al. | 75—109 |

GERALD L. KAPLAN, Primary Examiner

R. L. ANDREWS, Assistant Examiner

U.S. Cl. X.R.

204—119

PO-1050
(5/69)

UNITED STATES PATENT OFFICE
CERTIFICATE OF CORRECTION

Patent No. 3,826,648      Dated July 30, 1974

Inventor(s) Fernand Jacques Joseph Bodson

It is certified that error appears in the above-identified patent and that said Letters Patent are hereby corrected as shown below:

Column 2, lines 21 and 22 - delete "If it is desired to hold the copper and cadmium." first occurrence.

Signed and sealed this 3rd day of December 1974.

(SEAL)
Attest:

McCOY M. GIBSON JR.
Attesting Officer

C. MARSHALL DANN
Commissioner of Patents